United States Patent
Honma (12) 
(10) Patent No.: US 10,901,953 B2
(45) Date of Patent: Jan. 26, 2021

(54) STORAGE SYSTEM, FILE REPLICATION SYSTEM, FILE REPLICATION METHOD AND NON-TRANSITORY COMPUTER-READABLE MEDIUM

(71) Applicant: BUFFALO INC., Nagoya (JP)

(72) Inventor: Kazuki Honma, Nagoya (JP)

(73) Assignee: BUFFALO INC., Nagoya (JP)

( * ) Notice: Subject to any disclaimer, the term of this patent is extended or adjusted under 35 U.S.C. 154(b) by 191 days.

(21) Appl. No.: 15/894,572

(22) Filed: Feb. 12, 2018

(65) Prior Publication Data

US 2018/0232393 A1    Aug. 16, 2018

(30) Foreign Application Priority Data

Feb. 14, 2017 (JP) .................................. 2017-024583

(51) Int. Cl.
G06F 16/17 (2019.01)
G06F 16/178 (2019.01)

(52) U.S. Cl.
CPC .................................. *G06F 16/178* (2019.01)

(58) Field of Classification Search
CPC .................................................. G06F 16/178
USPC ........................................................ 707/610
See application file for complete search history.

(56) References Cited

U.S. PATENT DOCUMENTS

| | | | |
|---|---|---|---|
| 5,664,186 A * | 9/1997 | Bennett | G06F 11/1466 |
| 2003/0182329 A1 | 9/2003 | Sato | |
| 2004/0024909 A1 | 2/2004 | Yumoto et al. | |
| 2007/0288525 A1* | 12/2007 | Stakutis | G06F 11/1461 |
| 2015/0199375 A1* | 7/2015 | Prahlad | G06F 16/2365 |
| | | | 707/610 |

FOREIGN PATENT DOCUMENTS

| | | |
|---|---|---|
| JP | 2003-280965 A | 10/2003 |
| JP | 2004-005092 A | 1/2004 |
| JP | 2007-094477 A | 4/2007 |
| JP | 2007-328595 A | 12/2007 |
| JP | 5776499 B | 7/2015 |

* cited by examiner

*Primary Examiner* — Syling Yen
(74) *Attorney, Agent, or Firm* — Xsensus LLP (57) ABSTRACT

A storage system includes processing circuitry configured to detect a file operation in a folder of a first storage, sequentially register information of files having undergone a change as a file replication processing target in a database, execute file replication processing to sequentially replicate each individual file of the files registered as the file replication processing target to a second storage, execute folder replication processing to replicate the folder to the second storage, in the folder replication processing, exclude a file belonging to the folder for the folder replication processing from the file replication processing target, and execute the file replication processing in parallel with the folder replication processing when the information of the file having undergone a change has been registered as the file replication processing target in the database during the folder replication processing.

19 Claims, 8 Drawing Sheets

| ID | DATE | ACTION | PATH |
|---|---|---|---|
| 1 | 2017.01.20.10:00:00 | update | \A\a.txt |
| 2 | 2017.01.20.10:01:00 | update | \A\b.txt |
| 3 | 2017.01.20.10:01:50 | delete | \B\x.txt |
| ⋮ | ⋮ | ⋮ | ⋮ |

| ID | DATE | STATE | ACTION | PATH | ERROR |
|---|---|---|---|---|---|
| 1 | 2017.01.20.10:00:00 | finished | update | \A\a.txt | null |
| 2 | 2017.01.20.10:01:00 | unfinished | update | \A\b.txt | null |
| 3 | 2017.01.20.10:01:50 | unfinished | delete | \B\x.txt | E01 |
| ⋮ | ⋮ | ⋮ | ⋮ | ⋮ | ⋮ |

STORAGE SYSTEM, FILE REPLICATION SYSTEM, FILE REPLICATION METHOD AND NON-TRANSITORY COMPUTER-READABLE MEDIUM

CROSS-REFERENCE TO RELATED APPLICATION

This application claims priority from Japanese Patent Application No. 2017-024583, filed on Feb. 14, 2017, the entire subject matter of which is incorporated herein by reference.

TECHNICAL FIELD

The disclosure relates to a storage system, a file replication system, a file replication method, and a non-transitory computer-readable medium.

BACKGROUND

In a network attached storage (NAS), synchronization by file replication with another storage device (hereinafter, referred to as "replication") has been performed. As a synchronization method, for example, as disclosed in Japanese Patent No. 5,776,499B, a method of switching whether a file list, in which files to be synchronized are designated, is partially updated or regenerated, in accordance with a ratio of the number of updated files to a total number of files to be synchronized, and thus executing processing at high speed has been known.

For example, in case the file operation has been performed in hundreds of thousands units, when the synchronization is performed file by file, it may take time to complete the replication. Also, in this case, since the processing load of the NAS increases, the replication may fail. This problem is not limited to the replication, and is common to a technology of replicating the same file to other storage device or storage area, such as backup, mirroring and the like. For this reason, it is needed a technology by which it is possible to securely replicate files at high speed.

SUMMARY

According to one illustrative aspect of the disclosure there may be provided a storage system, comprising: a first storage configured to store a folder and files belonging to the folder; and processing circuitry configured to detect a file operation in the folder; sequentially register, in a database, information of a plurality of files having undergone a change, as a file replication processing target; execute file replication processing to sequentially replicate each individual file of the plurality of files registered as the file replication processing target to a second storage; and execute folder replication processing to replicate the folder to the second storage, wherein in executing the folder replication processing, the processing circuitry excludes a file belonging to the folder for the folder replication processing and registered as the file replication processing target from the file replication processing target before replicating the folder to the second storage, and the processing circuitry executes the file replication processing in parallel with the folder replication processing in case the information of the file having undergone a change has been registered as the file replication processing target in the database during the folder replication processing.

According to the storage system of this illustrative aspect, since the file replication is executed folder by folder by the folder replication processing, it is possible to replicate the files at high speed and with low load. Also, even during the folder replication processing, since the file replication processing is executed in parallel with the folder replication processing, it is possible to securely replicate the files. Therefore, according to the storage system of this aspect, it is possible to securely replicate the files at high speed.

In the storage system of the above aspect, the processing circuitry may be configured to periodically execute the folder replication processing. According to the storage system of this aspect, since the folder replication processing is executed periodically, it is possible to more securely replicate the files.

In the meantime, the disclosure can be implemented in a variety of forms. For example, the disclosure can be implemented in forms of a file replication system, a file replication method, a computer program, and the like. The computer program may be recorded in a non-transitory computer-readable medium.

DETAILED DESCRIPTION

A. First Illustrative Embodiment

Figure 1:
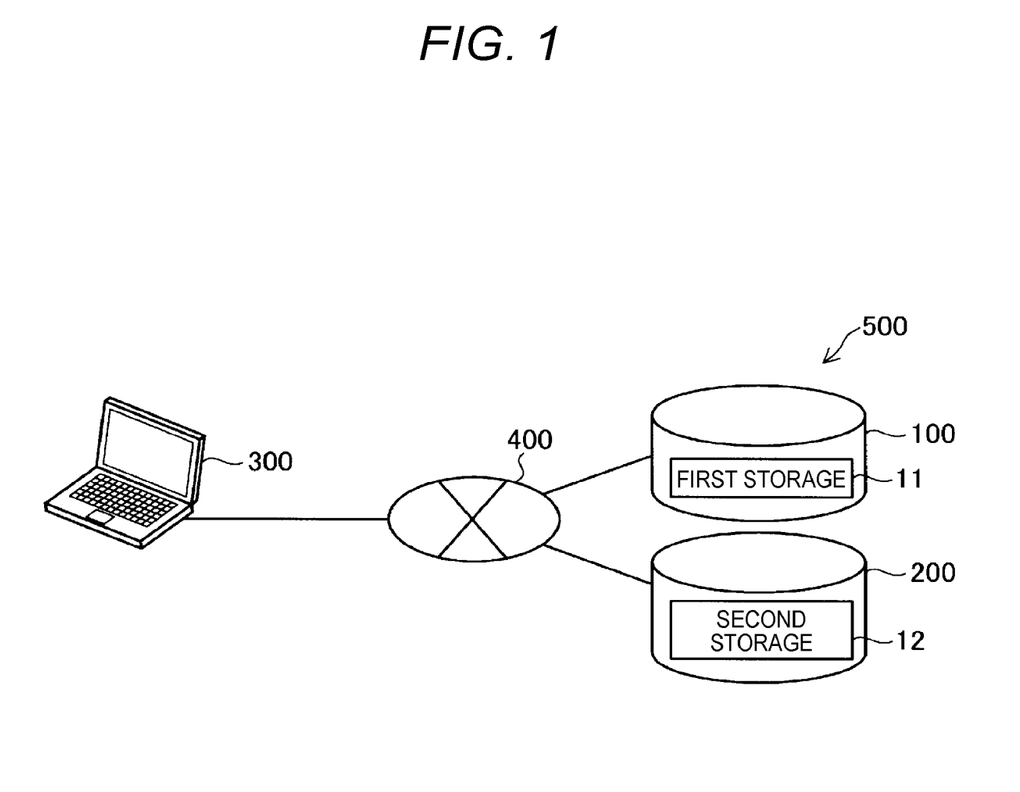
FIG. 1 is a view depicting an outline of a file replication system.

FIG. 1 is a view depicting an outline of a file replication system 500 in accordance with an illustrative embodiment of the disclosure. In a first illustrative embodiment, the file replication system 500 includes a first storage device 100, the second storage device 200 and a terminal device 300. In the first illustrative embodiment, the terminal device 300 is a PC. The terminal device 300 is not limited to the PC, and may be a variety of consumer devices such as a gaming device, a television, a recorder and the like. In the first illustrative embodiment, the file replication system 500 includes one terminal device 300 but may include a plurality of terminal devices.

The terminal device 300, the first storage device 100 and the second storage device 200 are connected each other via a network 400. The network 400 may be a wired network, and all or some of the network may be configured by a wireless network. Also, the network 400 may be a LAN, a WAN, the Internet or a combination thereof. The file replication system 500 is a system for replicating a file, which has been recorded in a first storage 11 of the first storage device 100 from the terminal device 300 via the network 400, to a second storage 12 of the second storage device 200 through the network 400. The "replication" that is to be executed in the file replication system 500 includes file replication in (1) processing (file synchronization, mirroring, replication and the like) to separately make the same file for a newly made file, an updated file and a deleted file and (2) processing (backup) to separately copy only a newly made file and an updated file, excluding a deleted file.

Figure 2:
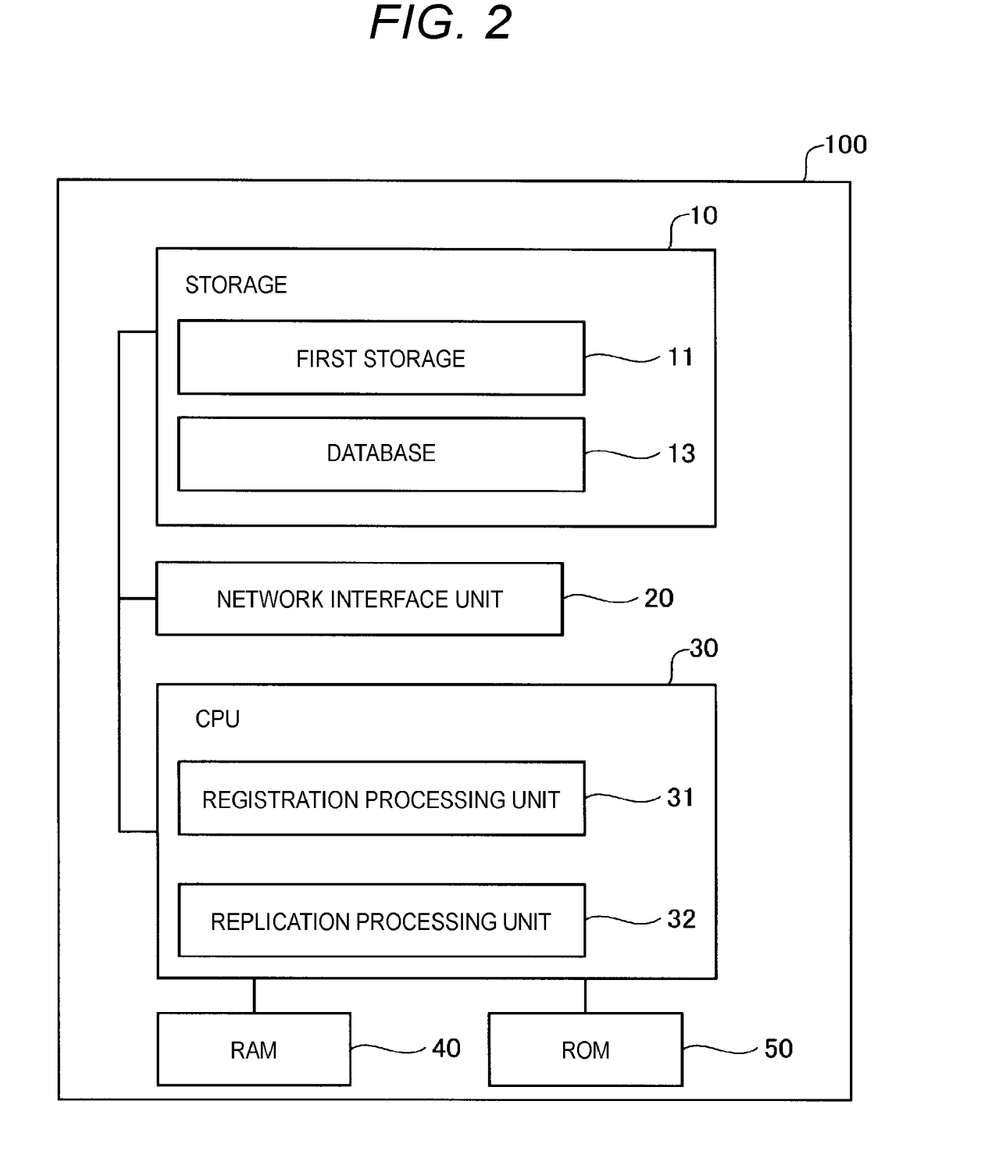
FIG. 2 is a view depicting a storage device.

FIG. 2 is a view depicting the first storage device 100 in accordance with an illustrative embodiment of the disclosure. In the first illustrative embodiment, the first storage device 100 is a NAS. The first storage device 100 includes a storage 10, a network interface unit 20, a CPU 30, a RAM 40, and a ROM 50. The first storage device 100 is simply referred to as "storage device", too.

As the storage 10, a hard disk drive of a magnetic disk drive type, a flash memory drive of a semiconductor memory element type, and the like are used. In the first illustrative embodiment, the storage 10 includes a first storage 11 and a database 13. The first storage 11 is configured to store a folder and a file belonging to the folder. In the database 13, an event content of a file operation performed from the terminal device 300 for the first storage 11 in the first storage device 100 is recorded for each event.

The network interface unit 20 is an interface for performing communication with other devices, for example, the second storage device 200 and the terminal device 300.

The CPU 30 is connected with the storage 10, the network interface unit 20, the RAM 40, and the ROM 50. In the ROM 50, a computer program (firmware) for operating the first storage device 100 is recorded. The firmware may be stored in the ROM 50. Also, the firmware may be recorded in a computer such as a memory card, an optical disk and the like, and a non-transient recording medium.

The CPU 30 is configured to function as a registration processing unit 31 and a replication processing unit 32 by loading the firmware recorded in the ROM 50 into the RAM 40 and executing the same. The registration processing unit 31 is configured to implement a function (registration function) of detecting a file operation in a folder in the first storage 11 and sequentially registering, in the database 13, information of files having undergone a change as a file replication processing target. The replication processing unit 32 is configured to implement a function (replication function) capable of executing file replication processing to sequentially replicate the files registered as the file replication processing target in the database 13 to the second storage 12 file by file, and folder replication processing to replicate filed belonging to the folder to the second storage 12 folder by folder.

Figure 3:
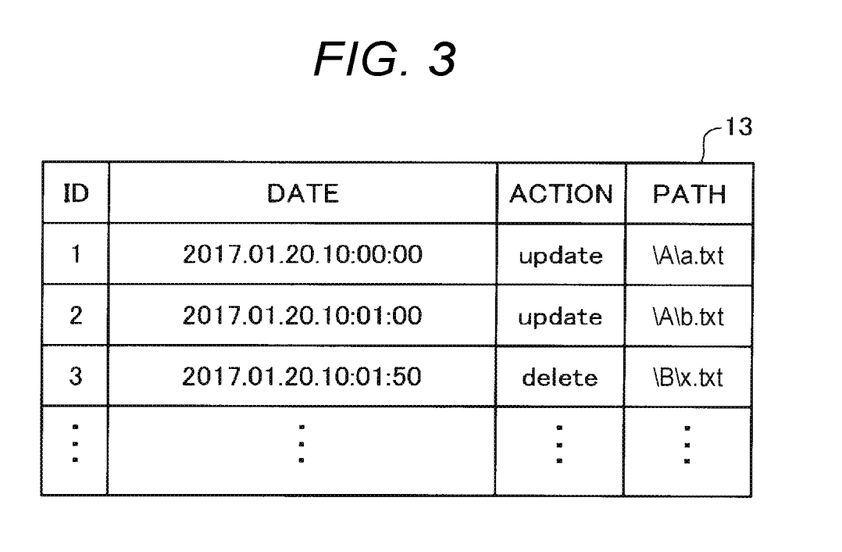
FIG. 3 depicts an example of a database.

FIG. 3 depicts an example of the database 13. In the first illustrative embodiment, in the database 13, each field of "ID", "DATE", "ACTION" and "PATH" is recorded for each file operation event. The "ID" field indicates a number inherent to each event, and the "DATE" field indicates date and time of registration for the database 13. The "ACTION" field indicates a file operation content, and any one of "update" and "delete" is recorded therein. The "update" indicates new making and update of a file, and "delete" indicates deletion of a file. The "PATH" field indicates a path of a file, for which a file operation is to be performed, in the first storage 11.

Figure 4:
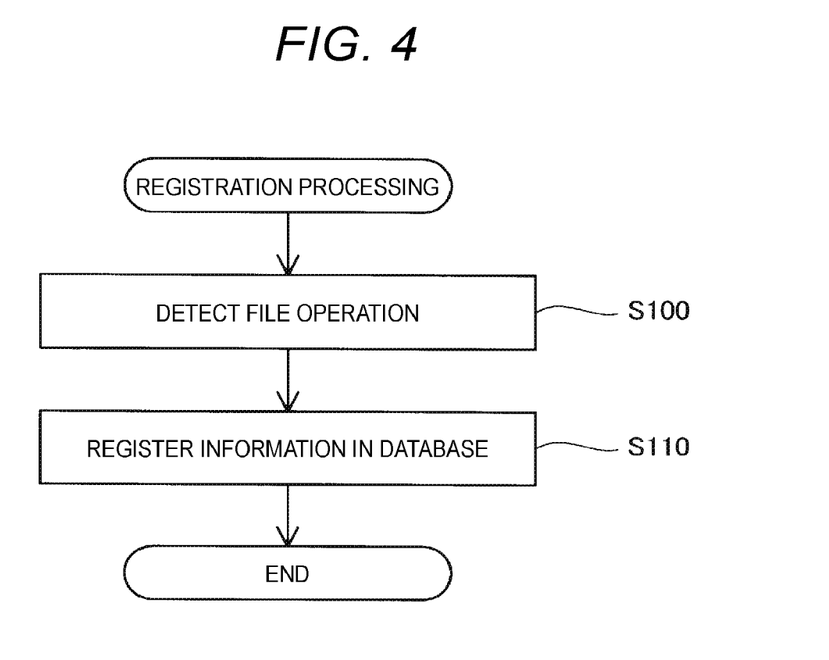
FIG. 4 is a flowchart depicting registration processing for the database.

FIG. 4 is a flowchart depicting registration processing for the database 13. This processing is processing that is to be repetitively executed by the registration processing unit 31 during an operation of the first storage device 100, and is processing for implementing the registration function. First, the registration processing unit 31 detects a file operation in a predetermined folder recorded in the first storage 11 (step S100). In the first illustrative embodiment, the "predetermined folder" is an uppermost folder (hereinafter, referred to as "root folder") of a folder hierarchy of the first storage 11. The target of the registration processing may be any folder, other than the root folder, and may be a plurality of folders.

Then, the registration processing unit 31 registers, in the database 13, information of files having undergone a change as the file replication processing target (step S110). Specifically, the registration processing unit 31 records "update" in the "ACTION" field of the database 13 (FIG. 3) for a newly made or updated file of the files having undergone a change, as the file replication processing target, and records "delete" in the "ACTION" field of the database 13 for a deleted file. In the meantime, steps S100 to S110 are also referred to as "registration process".

The above registration processing is executed simultaneously in parallel with file replication processing and folder replication processing, which will be described later, even when the file replication processing and folder replication processing are executed. By the registration processing, the first storage device 100 can detect the file operation in the folder, and sequentially register, in the database 13, the information of the files having undergone a change as the file replication processing target. That is, by the registration processing, the first storage device 100 can monitor the file operation from the terminal device 300 and register a hysteresis thereof in the database 13.

Figure 5:
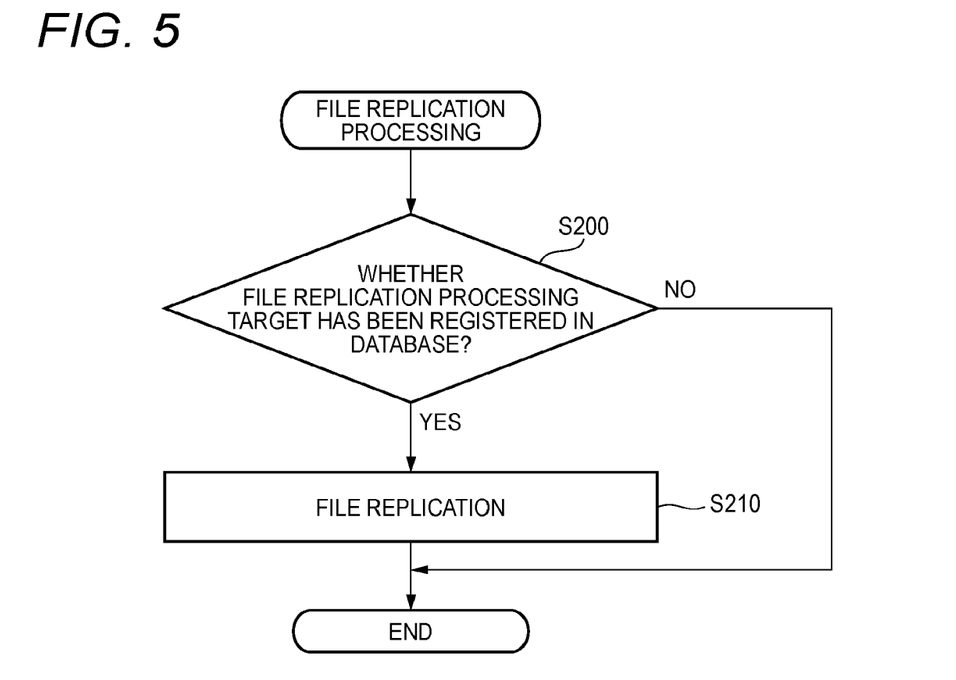
FIG. 5 is a flowchart depicting file replication processing.

FIG. 5 is a flowchart depicting file replication processing. This processing is processing that is to be repetitively executed by the replication processing unit 32 during the operation of the first storage device 100, and is processing for implementing the file replication processing of the replication function. In the first illustrative embodiment, the file replication processing is executed once for one minute. First, the replication processing unit 32 determines whether the file replication processing target has been registered in the database 13 (step S200). Specifically, in the database 13, a file for which "update" is recorded in the "ACTION" field is the file replication processing target. When it is determined that file replication processing target has not been registered (step S200: NO), the file replication processing is over. When it is determined that file replication processing target has been registered (step S200: YES), the replication processing unit 32 replicates the files registered as the file replication processing target to the second storage 12 file by file (step S210).

For the file replication, a rsync command is used, for example. When using the rsync command," the file is replicated to the second storage 12 by designating "rsync-a replication source file path (for example, "\A\a.txt") replication destination file path" and an argument. The replication source file path is a file path recorded in the "PATH" field of the database 13, and the replication destination file path is a file path in the second storage 12.

In the meantime, steps S200 to S210 are also referred to as "file replication process". By the above file replication processing, the first storage device 100 can sequentially replicate the files registered as the file replication processing target in the database 13 to the second storage 12 file by file. In the first illustrative embodiment, the replication processing unit 32 deletes the registration (records) of the files replicated in step S210 from the database 13 for.

Figure 6:
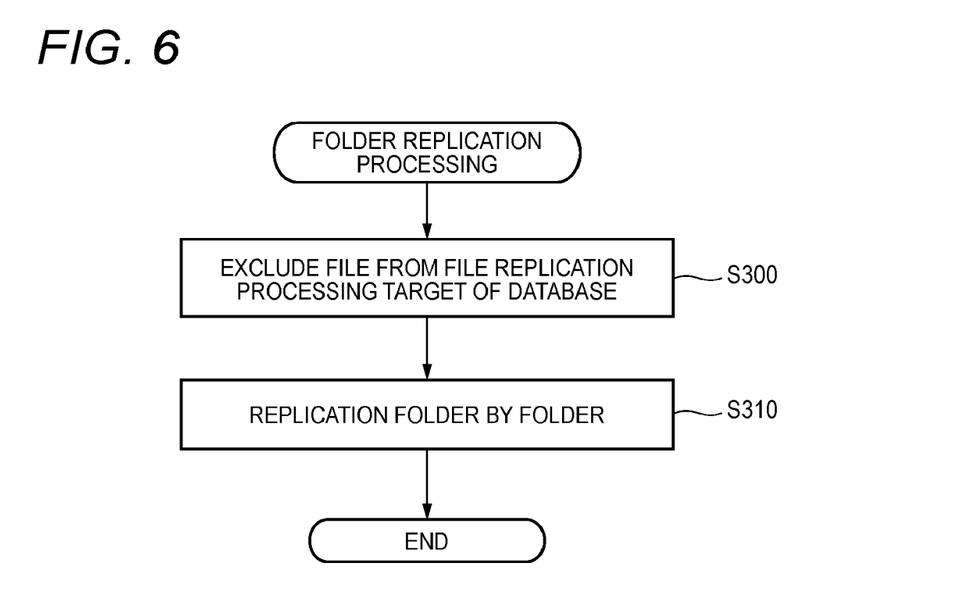
FIG. 6 is a flowchart depicting folder replication processing.

FIG. 6 is a flowchart depicting folder replication processing. This processing is processing that is to be executed periodically by the replication processing unit 32 during the operation of the first storage device 100, and is processing for implementing the folder replication processing of the replication function. In the first illustrative embodiment, the folder replication processing is executed once for one hour. First, in executing the folder replication processing, the replication processing unit 32 excludes a file belonging to the root folder, which is a replication processing target folder, and registered as the file replication processing target from the file replication processing target of the database 13 (step S300). Specifically, all the records are deleted from the database 13.

Then, the replication processing unit 32 collectively replicates the files belonging to the root folder to the second storage 12 folder by folder (step S310). For the folder replication, a rsync command is used, for example. When using the rsync command," the files are replicated to the second storage 12 folder by folder by designating "rsync-a replication source folder path replication destination folder path" and an argument. The replication source folder path is a folder path (a root, in the first illustrative embodiment) in the first storage 11, and the replication destination folder path is a folder path in the second storage 12. The target of the folder replication processing may be any folder, other than the root folder, and may be a plurality of folders.

In the meantime, steps S300 to S310 are also referred to as "folder replication process". By the folder replication processing, it is possible to collectively replicate the files belonging to the folder to the second storage 12 folder by folder. In the folder replication in step S310, only the added or updated files (i.e., differential files) are preferably replicated.

As described above, in the first illustrative embodiment, the replication processing unit 32 executes the folder replication processing once for one hour, and executes the file replication processing once for one minute. The replication processing unit 32 executes the file replication processing simultaneously in parallel with the folder replication processing in case the information of the files having undergone a change has been registered as the file replication processing target in the database 13, even when the folder replication processing is being executed.

According to the first storage device 100 of the first illustrative embodiment, since the replication processing unit 32 replicates the files folder by folder by the folder replication processing, it is possible to replicate the files at high speed and with low load. Also, since the replication processing unit 32 executes the file replication processing in parallel with the folder replication processing, even during the file replication processing, it is possible to replicate the updated file immediately and securely. In other words, according to the first illustrative embodiment, during the file synchronization file by file by the file replication processing, the folder synchronization by the folder replication processing is periodically executed in parallel with the file synchronization. Therefore, it is possible to lighten the load by reducing tasks corresponding the number of files piled up as the file replication processing target, and to securely implement the synchronization. Thus, according to the first storage device 100 of the first illustrative embodiment, it is possible to securely replicate the files at high speed. As a result, according to the first illustrative embodiment, it is possible to implement a secure fail-over with no omission. The fail-over is a technology of automatically taking over processing by using a preliminary system (for example, the second storage device 200) when a failure occurs in a system (for example, the first storage device 100) being currently used.

B. Second Illustrative Embodiment

Figure 7:
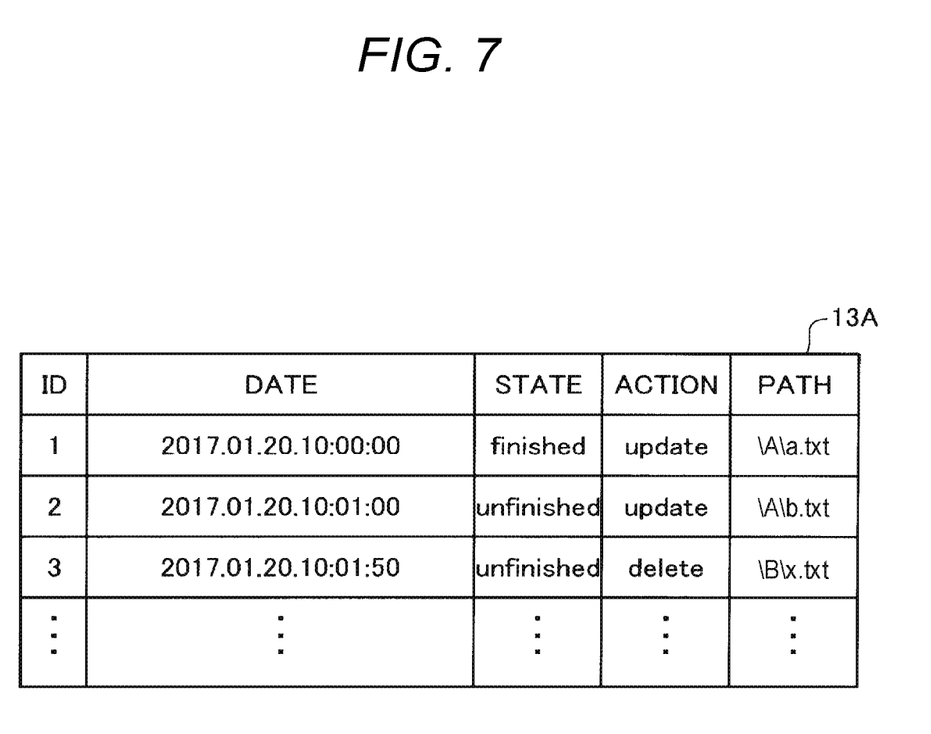
FIG. 7 depicts an example of a database in accordance with a second illustrative embodiment.

FIG. 7 depicts an example of a database 13A in accordance with a second illustrative embodiment. The second illustrative embodiment is different from the first illustrative embodiment, regarding a content of the database 13A and a processing content of the file replication processing. In the second illustrative embodiment, in the database 13A, each field of "ID", "DATE", "STATE", "ACTION", and "PATH" is recorded. The "STATE" field indicates a state of the file replication processing, and any one of "unfinished" and "finished" is recorded therein by the replication processing unit 32. "Unfinished" indicates that the file replication processing has not been executed, and "finished" indicates that the file replication processing has completed. In the second illustrative embodiment, "unfinished" is once recorded in the "STATE" field in step S110 of the registration processing shown in FIG. 4.

Figure 8:
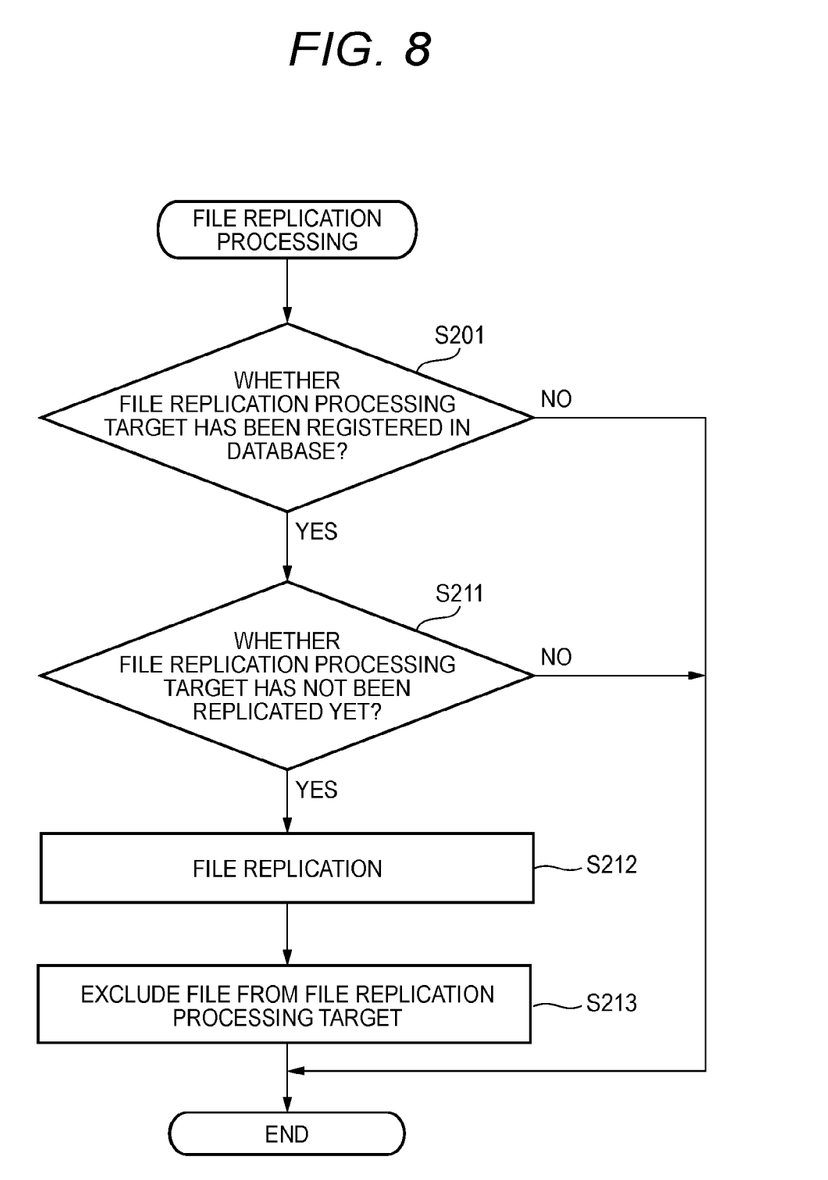
FIG. 8 is a flowchart depicting file replication processing in accordance with the second illustrative embodiment.

FIG. 8 is a flowchart depicting file replication processing in accordance with the second illustrative embodiment. This processing is processing that is to be repetitively executed by the replication processing unit 32 during the operation of the first storage device 100, like the first illustrative embodiment. First, the replication processing unit 32 determines whether the file replication processing target has been registered in the database 13A (step S201). When it is determined that the file replication processing target has not been registered (step S201: NO), the file replication processing is over. When it is determined that the file replication processing target has been registered (step S201: YES), the replication processing unit 32 determines whether the files registered as the file replication processing target have not been replicated yet (step S211). Specifically, a file for which "unfinished" has been recorded in the "STATE" field of the file replication processing target of the database 13A is determined as a file that has not been replicated yet.

When it is determined that the file replication processing target has been already replicated (step S211: NO), i.e., when "finished" has been recorded in the "STATE" field of the file replication processing target, the replication processing unit 32 ends the file replication processing. When it is determined that the file replication processing target has not been replicated yet (step S211: YES), i.e., when "unfinished" has been recorded in the "STATE" field of the file replication processing target, the replication processing unit 32 replicates the files registered as the file replication processing target to the second storage 12 file by file (step S212). Finally, the replication processing unit 32 excludes the files registered as the file replication processing target from the file replication processing target of the database 13A (step S213). Specifically, the replication processing unit 32 records "finished" in the "STATE" field of the file replication processing target of the database 13A.

According to the first storage device 100 of the second illustrative embodiment, the replication processing unit 32 determines whether the file registered as the file replication processing target has not been replicated yet, and then replicates the file. For this reason, it is possible to more securely replicate the files, based on the information of the file operations accumulated in the database 13A.

C. Third Illustrative Embodiment

Figure 9:
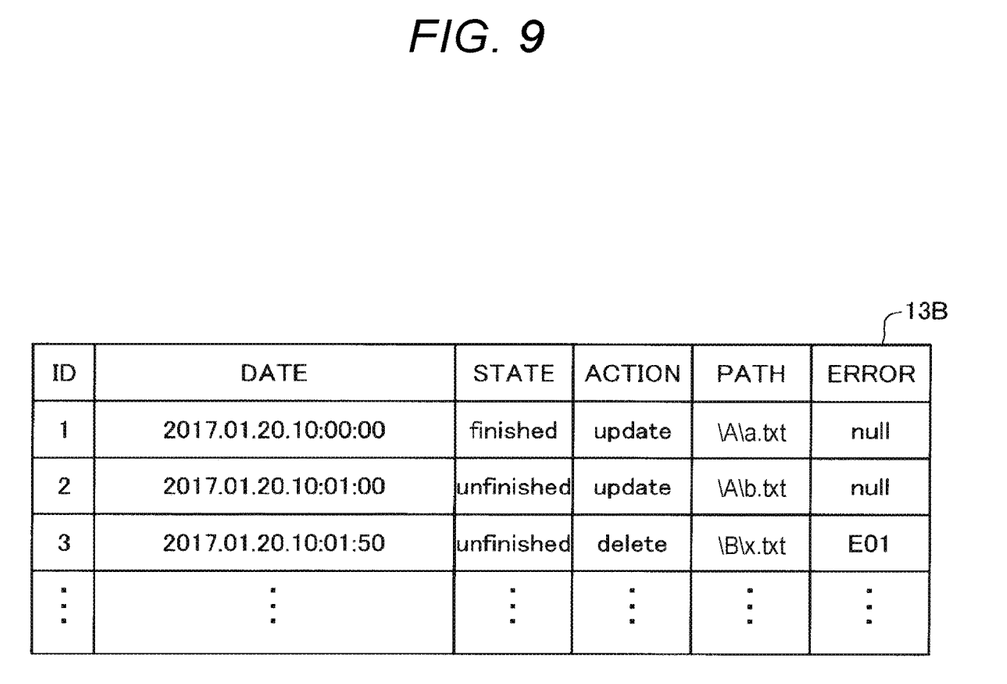
FIG. 9 depicts an example of a database in accordance with a third illustrative embodiment.

FIG. 9 depicts an example of a database 13B in accordance with a third illustrative embodiment. The third illustrative embodiment is different from the first illustrative embodiment, regarding a content of the database 13B and a processing content of the file replication processing. In the third illustrative embodiment, in the database 13B, each field of "ID", "DATE", "STATE", "ACTION", "PATH" and "ERROR" is recorded. The "ERROR" field indicates whether the file replication has failed or not. When the file replication has failed, an error type code is recorded by the replication processing unit 32.

Figure 10:
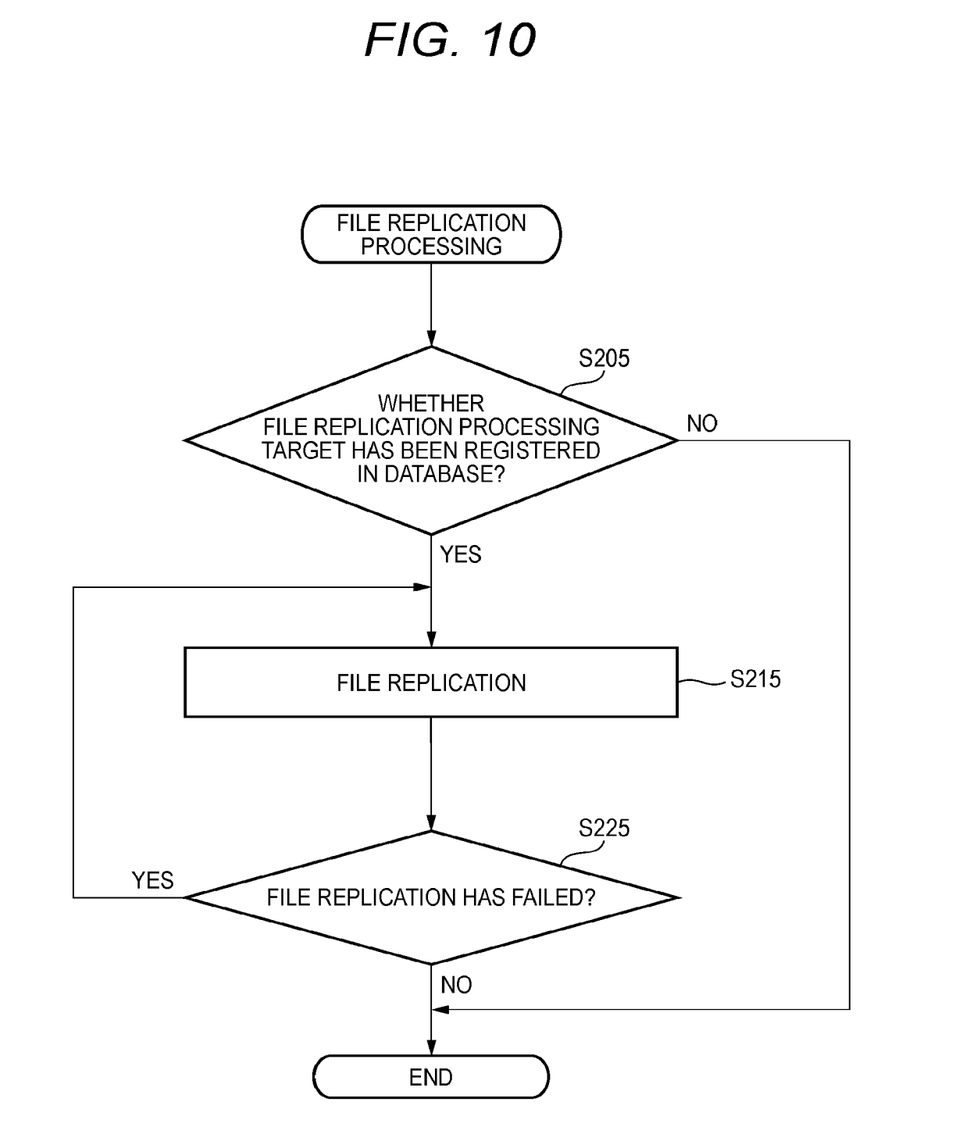
FIG. 10 is a flowchart depicting file replication processing in accordance with the third illustrative embodiment.

FIG. 10 is a flowchart depicting file replication processing in accordance with the third illustrative embodiment. This processing is processing that is to be repetitively executed by the replication processing unit 32 during the operation of the first storage device 100, like the first illustrative embodiment. First, the replication processing unit 32 determines whether the file replication processing target has been registered in the database 13B (step S205). When it is determined that the file replication processing target has not been registered (step S205: NO), the file replication processing is over. When it is determined that the file replication processing target has been registered (step S205: YES), the replication processing unit 32 replicates the files registered as the file replication processing target to the second storage 12 file by file (step S215).

When the file replication has failed in step S215, the replication processing unit 32 records an error type code corresponding to a cause of the error in the "ERROR" field of the database 13B. In the third illustrative embodiment, when a recording error occurs because it has been intended to replicate the same file as the file replication in the folder replication processing of FIG. 6, "E01" is recorded as the error type code.

Finally, the replication processing unit 32 determines whether the file replication in step S215 has not failed (step S225). Specifically, the replication processing unit 32 determines whether the error type code (E01), which indicates that the file replication has failed, has been recorded in the "ERROR" field of the file replication processing target of the database 13B. When the file replication has not failed (step S225: NO), the file replication processing is over. When the file replication has failed (step S225: YES), the replication processing unit 32 returns the processing to step S215, and repeats the processing of steps S215 and S225 until it is determined that an error has not occurred. That is, the file replication processing is executed until the file of the file replication processing target is replicated.

According to the first storage device 100 of the third illustrative embodiment, when the file replication has failed in the file replication processing, the replication processing unit 32 repeats the file replication until the file replication succeeds. For this reason, it is possible to more securely replicate the files.

In the meantime, in the file replication processing of step S215, like the second illustrative embodiment, after it is determined whether the file registered as the file replication processing target has not been replicated yet, based on the "STATE" field of the database 13B, the file replication may be executed (FIG. 8, steps S211 to S213).

In the third illustrative embodiment, when a physical error has occurred due to damage of the file, the replication processing unit 32 may record an error type code (for example, "E02") indicative of the error in the database 13B. When the error type code, which indicates the physical error due to damage of the file, is recorded, the replication processing unit 32 may repeat the processing of steps S215 and S225 by a predetermined number of times until the file is replicated, and when the file replication has failed by the predetermined number of times, the replication processing unit 32 may display the error or notify the error by a mail or the like, and then stop the file replication.

D. Modified Embodiments

First Modified Embodiment

In the illustrative embodiments, the first storage device 100 is configured to replicate the file to the second storage device 200. Regarding this, the first storage device 100 may be configured not only to replicate the file but also to delete the folder or file. That is, the first storage device 100 may be configured to execute synchronization of the folder or file with the second storage device 200. Specifically, the replication processing unit 32 deletes the file replication processing target for which "delete" has been recorded in the "ACTION" field (FIG. 3) of the database 13, in at least one of the file replication processing and the folder replication processing.

Second Modified Embodiment

In the illustrative embodiments, the second storage 12 is a storage area of the second storage device 200 connected to the first storage device 100 via the network. Regarding this, the second storage 12 may be a storage area of a storage (DAS: Direct Attached Storage), other than the network connection. In this case, the first storage device 100 includes a USB, IEEE1394 or eSATA as a connection interface to the DAS. Also, the second storage 12 may be embedded in the first storage device 100.

Third Modified Embodiment

In the illustrative embodiments, the first storage device 100 is the NAS connected to the terminal device 300 via the network 400. Regarding this, the first storage device 100 may be a DAS directly connected to the terminal device 300.

Fourth Modified Embodiment

In the illustrative embodiments, the file replication processing is executed once for one minute. Also, the folder replication processing is executed once for one hour. Regarding this, the execution frequencies of the file replication processing and the folder replication processing may be arbitrarily set. In the meantime, it is preferable that the file replication processing is executed more frequently than the folder replication processing.

Fifth Modified Embodiment

In the illustrative embodiments, the folder replication processing is executed periodically. However, the folder replication processing may also be executed irregularly. The term "irregularly" means timing associated with on or off of a power supply of the terminal device 300, timing associated with on or off of a power supply of the first storage device 100, or the like, for example.

The disclosure is not limited to the illustrative embodiments and the modified embodiments, and can be implemented in a variety of configurations without departing from the gist of the disclosure. For example, the technical features of the illustrative embodiments and modified embodiments corresponding to the technical features of the respective aspects described in SUMMARY can be appropriately replaced or combined so as to solve the above problems or to accomplish some or all of the above effects. Also, when the technical features are not described as essentials in the specification, they can be appropriately omitted.

10 . . . storage
11 . . . first storage
12 . . . second storage
13, 13A, 13B . . . database
20 . . . network interface unit
30 . . . CPU
31 . . . registration processing unit
32 . . . replication processing unit
40 . . . RAM
50 . . . ROM
100 . . . first storage device
200 . . . second storage device
300 . . . terminal device
400 . . . network
500 . . . file replication system

What is claimed is:

1. A storage system, comprising:
    a first storage configured to store a folder and files belonging to the folder; and
    processing circuitry configured to
        detect a file operation in the folder;
        sequentially register, in a database, information of a plurality of files having undergone a change, as a file replication processing target;
        execute file replication processing to sequentially replicate each individual file of the plurality of files registered as the file replication processing target to a second storage;
        execute folder replication processing to replicate the folder to the second storage, wherein
        in executing the folder replication processing, the processing circuitry excludes from the file replication processing target a file that belongs to the folder for the folder replication processing and is registered as the file replication processing target before replicating the folder to the second storage, and
        the processing circuitry executes the file replication processing in parallel with the folder replication processing in case the information of the file having undergone a change has been registered as the file replication processing target in the database during the folder replication processing; and
        register, in the database, information indicating whether the file replication processing has completed or not for each file operation.

2. The storage system according to claim 1, wherein the processing circuitry is configured to execute the folder replication processing periodically.

3. The storage system according to claim 1, wherein the files, which are collectively replicated to the second storage during the folder replication processing, include the files registered as the file replication processing target in the database.

4. The storage system according to claim 1, wherein the second storage is a Network Attached Storage connected to a storage device of the storage system via network.

5. The storage system according to claim 1, wherein the second storage is a Direct Attached Storage.

6. The storage system according to claim 1, wherein the change is either new making of a file, or deletion of a file.

7. The storage system according to claim 1, wherein the processing circuitry is configured to detect the file operation in a root folder.

8. The storage system according to claim 1, wherein the processing circuitry is configured to determine whether the file replication processing has completed or not regarding a file registered as the file replication processing target based on the information indicating whether the file replication processing has completed or not.

9. The storage system according to claim 8, wherein
    in case the processing circuitry determines the file replication processing has not completed regarding the file registered as the file replication processing target, the processing circuitry replicates the file to the second storage and excludes the file from the file replication processing target after the replication.

10. The storage system according to claim 1, wherein the processing circuitry is configured to register, in the database, information indicating whether the file replication processing has failed or not for each file operation.

11. The storage system according to claim 10, wherein the processing circuitry is configured to determine whether the file replication processing has failed or not after executing the file replication processing based on the information indicating whether the file replication processing has failed or not, and repeat the file replication processing in case the processing circuitry determines the file replication processing has failed.

12. The storage system according to claim 1, wherein the processing circuitry is configured to execute the file replication processing more frequently than the folder replication processing.

13. The storage system according to claim 1, wherein the processing circuitry is configured to execute the folder replication processing when power of the storage system is turned on.

14. The storage system according to claim 1, further comprising the second storage.

15. The storage system according to claim 1, further comprising the database.

16. A file replication method, comprising:
    storing, in a first storage, a folder and files belonging to the folder;
    detecting a file operation in the folder;
    sequentially registering, in a database, information of a plurality of files having undergone a change, as a file replication processing target;
    executing file replication processing to sequentially replicate each individual file of the plurality of files registered as the file replication processing target to a second storage;
    executing folder replication processing to replicate the folder to the second storage, wherein
    the folder replication processing includes excluding from the file replication processing target a file that belongs to the folder for the folder replication processing and is registered as the file replication processing target before replicating the folder to the second storage, and
    the method further comprising executing the file replication processing in parallel with the folder replication processing in case the information of the file having undergone a change has been registered as the file replication processing target in the database during the folder replication processing; and
    registering, in the database, information indicating whether the file replication processing has completed or not for each file operation.

17. The file replication method according to claim 16, wherein the folder replication processing is executed periodically.

18. A non-transitory computer readable medium including executable instructions, which when executed by a computer cause the computer to execute a file replication method, the method comprising:
- storing, in a first storage, a folder and files belonging to the folder;
- detecting a file operation in the folder;
- sequentially registering, in a database, information of a plurality of files having undergone a change, as a file replication processing target;
- executing file replication processing to sequentially replicate each individual file of the plurality of files registered as the file replication processing target to a second storage; and
- executing folder replication processing to replicate the folder to the second storage, wherein
- the folder replication processing includes excluding from the file replication processing target a file that belongs to the folder for the folder replication processing and is registered as the file replication processing target before replicating the folder to the second storage, and
- the method further comprising executing the file replication processing in parallel with the folder replication processing in case the information of the file having undergone a change has been registered as the file replication processing target in the database during the folder replication processing; and
- registering, in the database, information indicating whether the file replication processing has completed or not for each file operation.

19. The non-transitory computer readable medium according to claim 18, wherein the folder replication processing is executed periodically.

* * * * *